US012466092B2

(12) United States Patent
Xu et al.

(10) Patent No.: US 12,466,092 B2
(45) Date of Patent: Nov. 11, 2025

(54) ELECTRIC BEARD TRIMMER

(71) Applicant: Braun GmbH, Kronberg (DE)

(72) Inventors: Xiaolan Xu, Oberursel (DE); Roman Röder, Oberursel (DE); Andreas Peter, Kronberg (DE)

(73) Assignee: Braun GMBH, Kronberg (DE)

( * ) Notice: Subject to any disclaimer, the term of this patent is extended or adjusted under 35 U.S.C. 154(b) by 149 days.

(21) Appl. No.: 17/313,309

(22) Filed: May 6, 2021

(65) Prior Publication Data

US 2021/0347071 A1 Nov. 11, 2021

(30) Foreign Application Priority Data

May 8, 2020 (EP) .................................... 20173675

(51) Int. Cl.

| | |
|---|---|
| ***B26B 19/06*** | (2006.01) |
| ***B26B 19/04*** | (2006.01) |
| ***B26B 19/38*** | (2006.01) |

(52) U.S. Cl.

CPC .......... *B26B 19/063* (2013.01); *B26B 19/048* (2013.01); *B26B 19/3846* (2013.01); *B26B 19/3873* (2013.01)

(58) Field of Classification Search

CPC .............. B26B 19/3873; B26B 19/048; B26B 19/3846; B26B 19/042; B26B 19/063

USPC ............................................................ 30/43

See application file for complete search history.

(56) References Cited

U.S. PATENT DOCUMENTS

| | | | |
|---|---|---|---|
| 2,081,694 | A | 5/1937 | Bruecker |
| 2,151,965 | A | 3/1939 | Hanley |
| 2,251,577 | A | 8/1941 | Rand, Jr. |
| 2,273,739 | A | 2/1942 | Te Pas |
| 2,292,858 | A | 8/1942 | Adalbert |
| 2,335,288 | A | 11/1943 | Lundquist |
| 2,948,063 | A | 8/1960 | Ivar |
| 3,060,574 | A | 10/1962 | Thomas |
| 3,093,899 | A | 6/1963 | Futterer |
| 3,279,056 | A | 10/1966 | Mathew |

(Continued)

FOREIGN PATENT DOCUMENTS

| | | |
|---|---|---|
| AT | 308588 | 7/1973 |
| CH | 353651 A | 4/1961 |

(Continued)

OTHER PUBLICATIONS

CN 209682252, Translation (Year: 2025).*

(Continued)

*Primary Examiner* — Nhat Chieu Q Do

(74) *Attorney, Agent, or Firm* — Gerd Zetterer

(57) ABSTRACT

A cutter system is for an electric shaver and trimmer, comprising a pair of cooperating cutting elements with two rows of comb-like cutting teeth at opposite edges thereof and cutting perforations between said rows of comb-like cutting teeth, wherein said cutting elements are movably supported relative to each other by a support structure. The cutting perforations are arranged in two separated elongated fields of perforations which are separated from each other by an elongated unperforated center section of an outer one of said cutting elements defining a skin contact surface, and each of at least two rows of perforations extends along the rows of comb-like cutting teeth.

19 Claims, 8 Drawing Sheets

(56) References Cited

U.S. PATENT DOCUMENTS

| | | | | |
|---|---|---|---|---|
| 3,280,456 | A | 10/1966 | Erickson et al. | |
| 3,456,341 | A | 7/1969 | Loner et al. | |
| 4,133,103 | A | 1/1979 | Beck | |
| 4,552,832 | A | 11/1985 | Blume et al. | |
| 4,837,929 | A | 6/1989 | Tanahashi et al. | |
| 5,377,414 | A * | 1/1995 | Buzzi | B26B 19/26 30/346.51 |
| 5,979,060 | A | 11/1999 | Holzbauer et al. | |
| 6,279,234 | B1 | 8/2001 | Chaouachi et al. | |
| 6,505,404 | B2 | 1/2003 | Ullmann | |
| 6,889,437 | B2 | 5/2005 | Bader | |
| 8,104,181 | B2 | 1/2012 | Kawaguchi | |
| 9,381,655 | B2 | 7/2016 | Lau | |
| 9,592,613 | B2 | 3/2017 | Pohl et al. | |
| 9,718,200 | B2 | 8/2017 | Dryfhout | |
| 9,969,093 | B2 | 5/2018 | Piesker | |
| 10,391,647 | B2 | 8/2019 | Phoon et al. | |
| 10,406,702 | B2 | 9/2019 | Vredeveld et al. | |
| 10,647,010 | B2 | 5/2020 | Sablatschan | |
| 10,682,777 | B2 | 6/2020 | Huisman et al. | |
| 11,351,684 | B2 | 6/2022 | Phoon | |
| 11,364,646 | B2 | 6/2022 | Iaccarino | |
| 11,642,802 | B2 | 5/2023 | Xu et al. | |
| 12,194,647 | B2 * | 1/2025 | Wu | B26B 19/3846 |
| 2005/0097757 | A1 | 5/2005 | Mccambridge et al. | |
| 2006/0156555 | A1 * | 7/2006 | Janny | B26B 19/044 30/346.54 |
| 2008/0134512 | A1 | 6/2008 | Putzer | |
| 2008/0134515 | A1 | 6/2008 | Sato et al. | |
| 2011/0119929 | A1 | 5/2011 | Lau | |
| 2013/0125401 | A1 | 5/2013 | Shiba et al. | |
| 2014/0317932 | A1 | 10/2014 | Van Straaten et al. | |
| 2015/0314461 | A1 | 11/2015 | Man Wong et al. | |
| 2017/0028574 | A1 | 2/2017 | Iaccarino et al. | |
| 2017/0050326 | A1 | 2/2017 | Lau | |
| 2017/0113361 | A1 * | 4/2017 | Feijen | B26B 19/06 |
| 2017/0144319 | A1 | 5/2017 | Sablatschan | |
| 2017/0190063 | A1 | 7/2017 | Schratter et al. | |
| 2017/0361476 | A1 | 12/2017 | Phoon et al. | |
| 2018/0009121 | A1 | 1/2018 | Stapelbroek et al. | |
| 2018/0021965 | A1 | 1/2018 | Phoon et al. | |
| 2018/0257248 | A1 | 9/2018 | Wu | |
| 2018/0281213 | A1 | 10/2018 | Eijkelkamp et al. | |
| 2021/0347069 | A1 | 11/2021 | Röder et al. | |
| 2021/0347070 | A1 | 11/2021 | Röder et al. | |
| 2021/0347072 | A1 | 11/2021 | Xu et al. | |
| 2021/0347076 | A1 | 11/2021 | Xu et al. | |
| 2023/0150155 | A1 * | 5/2023 | Wu | B26B 19/08 30/41.9 |

FOREIGN PATENT DOCUMENTS

| | | | | |
|---|---|---|---|---|
| CN | 102452095 | A | 5/2012 | |
| CN | 204339817 | U | 5/2015 | |
| CN | 104999484 | A | 10/2015 | |
| CN | 204894008 | U | 12/2015 | |
| CN | 106346519 | A | 1/2017 | |
| CN | 206287174 | * | 6/2017 | |
| CN | 206287174 | U | 6/2017 | |
| CN | 108724253 | A | 11/2018 | |
| CN | 209190826 | U | 8/2019 | |
| CN | 209478241 | U | 10/2019 | |
| CN | 209682252 | U * | 11/2019 | |
| CN | 111390978 | A * | 7/2020 | B26B 19/044 |
| CN | 113910306 | A | 1/2022 | |
| DE | 2455723 | A1 | 8/1976 | |
| DE | 4031871 | C1 | 12/1991 | |
| DE | 4042125 | A1 | 7/1992 | |
| DE | 19939509 | A1 | 3/2001 | |
| EP | 0707926 | A1 | 4/1996 | |
| EP | 0633822 | B1 | 5/1998 | |
| EP | 1047806 | B1 | 4/2003 | |
| EP | 2875915 | A1 | 5/2015 | |
| EP | 2875916 | A1 | 5/2015 | |
| EP | 3388207 | A1 | 10/2018 | |
| EP | 3461602 | A1 * | 4/2019 | B26B 19/04 |
| EP | 3466619 | A1 | 4/2019 | |
| EP | 3546146 | A1 * | 10/2019 | B26B 19/105 |
| EP | 3907043 | B1 | 1/2024 | |
| GB | 501137 | A | 2/1939 | |
| GB | 719005 | A | 11/1954 | |
| JP | S5568973 | U | 5/1980 | |
| JP | H10323463 | A | 12/1998 | |
| JP | 2008142275 | A | 6/2008 | |
| JP | 2017511230 | A | 4/2017 | |
| KR | 20060125507 | A | 12/2006 | |
| WO | 2010142775 | A1 | 12/2010 | |
| WO | 2015158923 | A1 | 10/2015 | |
| WO | 2018068353 | A1 | 4/2018 | |
| WO | 2018189173 | A1 | 10/2018 | |

OTHER PUBLICATIONS

All Office Actions; U.S. Appl. No. 17/313,336, filed May 6, 2021.
All Office Actions; U.S. Appl. No. 17/313,273, filed May 6, 2021.
All Office Actions; U.S. Appl. No. 17/313,396, filed May 6, 2021.
All Office Actions; U.S. Appl. No. 17/313,292, filed May 6, 2021.
Extended EP Search Report and Written Opinion for 20173675.8 dated Feb. 8, 2021, 12 Pages.
Extended EP Search Report and Written Opinion for 21172563.5 dated Sep. 14, 2021, 9 Pages.
PCT Search Report and Written Opinion for PCT/IB2021/053851 dated Jul. 27, 2021, 13 pages.
Rain Noe; "A History of Braun Design"; Mar. 6, 2013; https://www.core77.com/posts/24437/a-history-of-braun-design-part-1-electric-shavers-24437; retrieved from the internet on Dec. 23, 2024.
"Electroforming: A Tour Through the Process (3D)"; uploaded Mar. 27, 2018; https://www.youtube.com/watch?v=t7LSLKvwa5Y; retrieved from Internet on Dec. 23, 2024.
"Scherkopf"; Wikipedia article; Version 1 of Mar. 2020; https://de.wikipedia.org/w/index.php?title=Scherkopf&oldid=197325962; Retrieved from the internet on Dec. 23, 2024.
Rattenberger, B.; Extended European Search Report; European Patent Application No. 21172563.5; Sep. 14, 2021; European Patent Office, Munich, Germany.

* cited by examiner

ELECTRIC BEARD TRIMMER

FIELD OF THE INVENTION

The present invention relates to cutting body hair such as beard stubbles of multidays' beard. More particularly, the present invention relates to a cutter system for an electric shaver and/or trimmer, comprising a pair of cooperating cutting elements with two rows of comb-like cutting teeth at opposite edges thereof and at least one field of cutting perforations between said rows of comb-like cutting teeth, wherein said cutting elements are movably supported relative to each other by a support structure.

BACKGROUND OF THE INVENTION

Electric shavers and trimmers utilize various mechanisms to provide hair cutting functionality. Some electric shavers include a perforated shear foil cooperating with an undercutter movable relative thereto so as to cut hairs entering the perforations in the shear foil. Such shear foil type shavers are often used on a daily basis to provide for a clean shave wherein short beard stubbles are cut immediately at the skin surface.

On the other hand, other cutter systems including a pair of cooperating cutting elements with comb-like edges including one or more rows of comb-like or rake-like cutting teeth reciprocating or rotating relative to each other, are often used for cutting longer beard stubbles or problem hair that is difficult to cut due to, for example, a very small angle to the skin or growing from very resilient skin. The teeth of such comb-like or rake-like cutting elements usually project substantially parallel to each other or substantially radially, depending on the type of driving motion, and may cut hairs entering into the gaps between the cutting teeth, wherein cutting or shearing is achieved in a scissor-like way when the cutting teeth of the cooperating elements close the gap between the finger-like cutting teeth and pass over each other.

Such cutter systems for longer hairs may be integrated into electric shavers or trimmers which at the same time may be provided with the aforementioned shear foil cutters. For example, cutting elements may include two rows of comb-like cutting teeth arranged, for example, at opposite sides of the cutting elements and a field of shear foil-like cutting perforations between said rows of comb-like cutting teeth.

For example, EP 24 25 938 B1 shows a shaver with a pair of long hair trimmers integrated between shear foil cutters. Furthermore, EP 27 47 958 B1 and CN 206 287 174 U disclose hair trimmers having two rows of cooperating cutting teeth arranged at opposite sides of the shaver head, wherein the cutting teeth of the upper comb-like cutting element are provided with rounded and thickened tooth tips overhanging the tooth tips of the lower cutting element so as to prevent the projecting tooth tips from piercing into the skin and from irritating the skin. A similar cutter system is shown in US 2017/0050326 A1 wherein in such cutter system the lower comb-like cutting element is fixed and the upper comb-like cutting element is movable.

Shavers and/or trimmers combining rows of comb-like cutting teeth at opposite edges and shear foil-like cutting perforations between said rows of comb-like teeth sometimes include C-shaped outer cutting elements the edges of which are dog-eared to form limbs bent inwardly like the limbs of a C or a U, wherein such dog-eared limbs are held by a support frame. The transitional edge portion connecting the dog-eared limbs with the central portion of the outer cutting element is contoured or configured to form a row of comb-like teeth for cutting longer stubbles, whereas the central portion of the cutting element is provided with at least one field of perforations for cutting short hair. Said outer cutting element cooperates with an inner cutting element which may be plate-shaped and may include rows of comb-like teeth at opposite edges to cooperate with the comb-like teeth of the outer cutting element, and furthermore at least one field of perforations or other cutouts between the comb-like toothed edges for cooperating with the perforations in the outer cutting element.

Thus, shear foil like cutting perforations for cutting short hairs and comb-like cutting teeth for cutting longer hairs or stubbles may be integrated into the same cutting elements, wherein the inner cutting element may be biased against the outer cutting element usually by means of a spring device which may include a pair of flexible spring arms extending from a central base portion of the support structure towards the inner cutting element. Said spring arms may have a sort of V-shaped configuration and may contact the inner cutting element at sections between the central field of perforations and the opposite toothed edges. Due to such biasing of the inner cutting element against the outer cutting element, tugging and pulling hairs to be cut in the perforations can be avoided, but, on the other hand, the friction between the cutting elements is rather high what causes high energy consumption by the drive unit and furthermore heating of the cutting elements what is often felt unpleasing or uncomfortable. Such cutter systems are shown in documents CN 209 478 241 U and US 2018/0257248 A1.

A similar cutter system is disclosed by EP 31 31 716 B1, wherein the support structure includes an outer frame holding the outer cutting element at opposite edge portions thereof, wherein such outer frame includes, at its inner surface, a step-like projection forming a shoulder for supporting the inner cutting element at the toothed, comb-like edges. More particularly, said projecting shoulder at the inner surface of the outer support frame defines a gap extending from said shoulder to the outer cutting element, in which gap the inner cutting element is slidably received, wherein such gap provides for a vertical clearance which is adapted to the vertical thickness of the inner cutting element. Depending on the vertical clearance between the projecting shoulder and the outer cutting element, friction may be reduced, whereas the cutter system is prone to pulling and tugging hair to be cut by the cutting perforations since the inner cutting element may not be held close enough to the outer cutting element so hair to be cut may get stuck between the cutting perforations of the outer cutting element and the perforations or cutouts of the inner cutting element cooperating therewith.

Such beard stubble trimmers and shavers need to address quite different and diverging functional requirements and performance issues such as closeness, thoroughness, good visibility of the cutting location, efficiency and pleasant skin feel, good ergonomics and handling. Closeness means short or very short remaining stubbles, whereas thoroughness means less missed hairs particularly in problem areas like the neck. Efficiency means less and faster strokes suffice to achieve the desired trimming result. Pleasant skin feel depends on the individual user, but often includes less irritation in form of nicks, cuts or abrasion and better gliding onto the skin. Visibility of the cutting location is particularly important in case of styling or edging contours to accomplish hair removal with local accuracy.

Fulfilling such various performance issues at the same time is quite difficult. Meeting such needs becomes even more difficult when different types of cutting contours such as shear foil-like perforations and comb-like rows of teeth are integrated into the same cutting elements such as c-shaped cutting blades reciprocating relative to each other since such multiple-function cutter elements may not be adapted exclusively to one specific cutting function.

SUMMARY OF THE INVENTION

It is an objective underlying the present invention to provide for an improved cutter system avoiding at least one of the disadvantages of the prior art and/or further developing the existing solutions. A more particular objective underlying the invention is to provide for a close and thorough cutting of hair and longer stubbles including a good control of edging contours and, at the same time, avoiding skin irritations. Another objective underlying the present invention is a reliable and clean cutting action of the cooperating cutting teeth and cutting perforations to avoid pulling and tugging of hair, without sacrificing low friction between the cutting elements, low temperatures of the cutting teeth and low energy consumption and thus long energy storage life.

According to an aspect, the cutting perforations for cutting short hair are restricted to areas following a row of comb-like cutting teeth when the cutter system is moved along the skin to be shaved with one of the rows of comb-like teeth moving ahead, whereas a middle portion of the skin contact/facing surface defined by the cutting elements in-between said opposite rows of comb-like teeth is unperforated. Such arrangement of restricted areas of perforations separated from each other takes into account that very short hair is cut by the perforations immediately following the comb-like teeth and/or positioned close to said comb-like teeth when the cutter system is moved along the skin to be shaved in a common manner, i.e. with one of the comb-like cutting edges moving ahead, whereas the perforations further away from the leading comb-like cutting edge are less effective in cutting very short hairs. Said perforations, when viewed in a longitudinal section, expand towards the skin contact/facing surface of the outer cutting element which assures skin comfort on the one skin side and sharp edges on the inner side of the outer cutting element.

Due to the elimination of perforations in areas of the skin contact surface less effective in cutting very short hairs reduces the friction between the cutting elements without sacrificing efficiency in cutting very short hairs. Friction is reduced as less cutting edges of less perforations need to pass each other when the cutting elements move relative to each other and, thus, hair particles already cut or hair dust coming from the cutting perforations moving ahead over the skin to be shaved is not cut or grinded once again so frictional losses are reduced.

More particularly, the cutting perforations may be arranged in two separated elongated fields of perforations which are separated from each other by an elongated unperforated center section of an outer one of said cutting elements defining a skin contact surface, and which include each at least two rows of perforations extending along the rows of comb-like cutting teeth.

So as to allow for sufficient support of the cutting elements moving relative to each other without interference of the support with the cutting action of the comb-like teeth and perforations, said fields of perforations also may be separated from the rows of comb-like teeth by elongated, unperforated side sections of said outer cutting element, wherein the support structure may include a pair of flexible or rigid support ribs supporting an inner one of said cutting elements under said unperforated side sections along outer boundaries of said fields of perforations.

So as to reduce friction due to engagement of the support structure with the moving cutting element, the inner cutting element may extend unsupported under said unperforated center section between said fields of perforations.

Friction, heat release and energy consumption can be further reduced, but nevertheless a clean and reliable cutting action avoiding pulling and tugging of hair with the cutting perforations can be achieved by means of a specific support structure sandwiching one of the cutting elements in a gap of well-defined width between the other cutting element and support ribs which may be formed rigid and may extend from a base portion of said support structure at a steeper angle than said outer frame portions with rigid support edges of said ribs supporting the inner cutting element along the outer edge of said field of cutting perforations. When such supporting ribs are rigid, the position of the support edges is kept and maintained precisely under different load conditions so the inner cutting element does not need to be biased against the outer cutting element, but is nevertheless kept and supported exactly in a desired position at the outer cutting element. When the ribs do not flex under operational loads, exact support of the inner cutting element in the desired position may be achieved without significant frictional losses.

These and other advantages become more apparent from the following description giving reference to the drawings and possible examples.

DETAILED DESCRIPTION OF THE INVENTION

Figure 1:
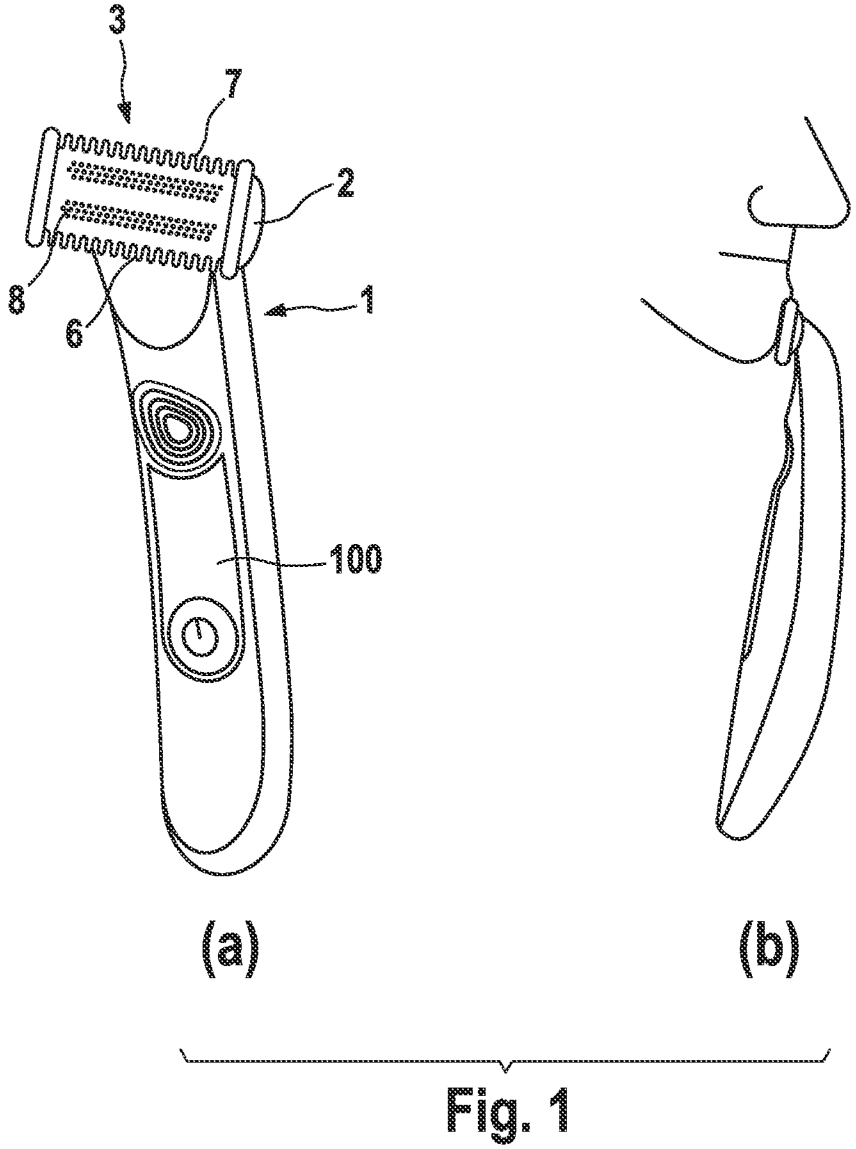
FIG. 1: perspective views of an electric beard trimmer/shaver including a cutting system with a pair of cooperating comb-like cutting elements reciprocating relative to each other, wherein partial view (a) shows a front side of the electric beard trimmer and partial view (b) shows the beard trimmer working on a chin.

So as to combine closeness and efficient short hair cutting with low friction, reduced heating and, thus, reduced energy consumption, it is suggested to provide for cutting perforations only in limited areas of the skin contact surface between the opposite rows of comb-like cutting teeth and to provide for an unperforated center section in-between said opposite rows of comb-like cutting teeth. More particularly, the cutting perforations for cutting short hairs left over from the comb-like cutting teeth may be concentrated in areas close to said rows of comb-like cutting teeth.

According to an aspect, the cutting perforations for cutting short hair are restricted to areas of the skin contact surface or skin facing surface of the cutting elements following the comb-like cutting teeth when the cutter system is moved along the skin to be shaved with one of the rows of comb-like teeth moving ahead, whereas a middle portion of the skin contact/facing surface defined by the cutting elements in-between said opposite rows of comb-like teeth is unperforated.

Such arrangement of restricted areas of perforations separated from each other takes into account that very short hair is cut by the perforations immediately following the comb-like teeth or position close to said comb-like teeth when the cutter system is moved along the skin to be shaved in a usual manner, i.e. with one of the comb-like cutting edges moving ahead, whereas the perforations further away from the leading comb-like cutting edge are less effective in cutting very short hairs. Due to the elimination of perforations in areas of the skin contact surface less effective in cutting very short hairs reduces the friction between the cutting elements without sacrificing efficiency in cutting very short hairs. Friction is reduced as less cutting edges of less perforations need to pass each other when the cutting elements move relative to each other and, thus, hair particles already cut or hair dust coming from the cutting perforations moving ahead over the skin to be shaved is not cut or grinded once again so frictional losses are reduced.

More particularly, the cutting perforations may be arranged in two separated elongated fields of perforations which are separated from each other by an elongated unperforated center section of an outer one of said cutting elements defining a skin contact surface, and which include each at least two rows of perforations extending along the rows of comb-like cutting teeth.

So as to allow for sufficient support of the cutting elements moving relative to each other without interfering with the cutting action of the comb-like teeth and perforations, said fields of perforations also may be separated from or spaced apart from the rows of comb-like teeth by elongated, unperforated side sections of said outer cutting element, wherein the support structure may include a pair of flexible or rigid support ribs supporting an inner one of said cutting elements under said unperforated side sections adjacent to or along outer boundaries of said fields of perforations.

So as to reduce friction due to engagement of the support structure with the moving cutting element, the inner cutting element may extend unsupported under said unperforated center section between said fields of perforations.

Said elongated unperforated center section of the skin contact surface defined by the outer cutting element may have a size or width which is larger than a size or width of each of said fields of perforations. More particularly, the unperforated center section of the skin contact surface may extend over an area ranging from 100% to 250% or from 110% to 175% of the area defined by each of said fields of perforations.

More generally, more than ⅔ or more than ¾ of the area of the skin contact surface of the cutter elements between the comb-like cutting teeth may be unperforated. In other words, only ¼ to ⅔ of the skin contact surface between the opposite rake-like toothed edges of the cutter system may be perforated. Such limitation of the area of perforations may significantly reduce the friction when the cutting elements move relative to each other. Such friction is not only caused by the cutting edges of the perforations which have to pass each other to achieve shaving or cutting of hair, but is usually increased when tiny hair particles or hair dust is cut once again in a sort of repeated or perpetual grinding action effected by the cutting perforations when such hair dust is collected in said perforations.

So as to ensure efficiency of short hair cutting despite the limited area of the fields of perforations, the skin contact/facing surface defined by the cutter elements may be, in cross-sectional view, convex from one rake-like tooth edge over said plurality of fields of perforations to the opposite one of said rake-like tooth edges of the cutting elements, wherein the aforementioned unperforated center section of the skin contact surface may define the largest height over a virtual straight baseline going through the tooth tips of said rows of comb-like teeth. In other words, the skin contact surface may be sloped or rising from the comb-like teeth running ahead to the trailing field of perforations. More particularly, the skin contact surface may be rising from the running ahead cutting teeth towards the center section of the skin contact surface and then again descent towards the opposite row of comb-like cutting teeth.

More particularly, the skin contact surface may be continuously, smoothly dome-shaped, when viewed in cross-section, from one row of comb-like cutting teeth over said fields of perforations to the opposite row of comb-like teeth. Considering the entire skin contact surface, it may have a smoothly curved, convex chute-shape or trough shape like a barrel-shaped roof.

In the alternative, the skin contact and/or facing surface may be contoured to include one or more flat sections which may correspond to the unperforated center section and/or unperforated side sections and/or correspond to at least one of said fields of perforations.

So as to achieve efficient short hair cutting with a limited member of rows of perforations, said perforations, when viewed in the direction of the hole-axis and/or perpendicular to the skin contact/facing surface, may have a non-circular contour including a longer main axis and a shorter main axis, wherein the non-circular perforations may be oriented such that their longer main axis extends transverse to the longitudinal direction of the rows of comb-like cutting teeth and/or transverse to the axis of reciprocating of the cutter elements. The shorter main axis of the non-circular perforations may extend substantially parallel to the longitudinal direction of the rows of comb-like cutting teeth and/or substantially parallel to the axis of reciprocation.

The orientation of the longer main axis transverse to the rows of comb-like cutting teeth brings the hair to be cut in the perforations into a well-defined position within the perforation what may improve cutting action. More particularly, the transverse orientation of the longer main axis is based on the assumption that, usually, the cutter system is moved along the skin to be shaved in a direction transverse to the rows of comb-like cutting teeth since, usually, users pull or push the cutter system with one of the rake-like, tooth cutting edges along the skin surface so that one of said rake-like cutting edges is going ahead. Thus, when considering the usual direction of movement of the cutter system over the skin surface, said transverse orientation of the longer main axis of the perforations allow for easier entry of hair into the perforations and, moreover, urges the hair extending in or through a perforation into the trailing corner or trailing sector of the perforation. Thus, the hair is urged into a well-defined position within the perforation before it is cut.

Said non-circular perforations may have an elliptical or oval or lozenge or rhomb shape. However, so as to allow for a large perforation size with small-sized unperforated areas between single perforations, said perforations may have a hexagonal contour. Such hexagonal contours allow for a dense arrangement of the perforations with a high ratio of perforations per field area. Thus, entry of lots of hairs into the perforations is enhanced. At the same time, the hexagonal shape provides for the aforementioned longer and shorter main axis, wherein the hexagonal perforations may be oriented such that the longer main axis is transverse to the longitudinal direction to the rows of comb-like teeth.

The aforementioned separate fields of perforations may include the same number or different numbers of rows of perforations. More particularly, each field of perforations may include two or three or two to five rows of perforations, wherein, for example, two or three rows of non-circular or hexagonal perforations may be provided in each field of perforations with the longer main axis of the perforations being oriented transverse to the longitudinal direction of the comb-like cutting teeth.

So as to help the hair to be cut to enter into the relatively small perforations, the perforations may, when viewed in longitudinal section, expand or widen towards the skin contact/facing surface. Such non-cylindrical contour of the perforations may have a trumpet-like shape or a conical shape or pyramidal or truncated-pyramid shape depending on the cross-sectional shape of the perforations. The contour of the perforations of the outer cutting element may form an acute angled cutting edge towards the side of the inner (driven) cutting element. Said acute angle is preferably in the range between 25 to 60 degree. The contour edge of the perforations towards the skin side is provided with an obtuse angle and thus increasing the skin comfort. Similarly, the contour of the cutting edge of the inner cutter adapted to interact with the cutting edge of the perforations of the outer cutter, so on the side towards the outer cutter is also provided with an acute angled sharp.

So as to achieve a smooth, comfortable cutting action, it is helpful to avoid separating the cutting elements and thus, the cooperating comb-like teeth and/or the cooperating cutting perforations from one another so as to avoid that hair is no longer properly cut or even clamped between the teeth moving relative to each other or between the cutting perorations moving relative to each other. Basically, this can be prevented by means of pressing the cooperating cutting elements against each other, for example by means of spring devices urging the teeth of one cutting element against the teeth of the other cutting element. In the alternative or in addition to such flexible support ribs, one of the cutting elements may be sandwiched between the other cutting element and support elements or a support structure like a support frame which may include rigid ribs or web-like flanges precisely and rigidly supporting and guiding the inner cutting element at a predetermined position under the outer cutting element and sufficiently close thereto, said rigid support ribs and the outer cutting element defining a gap in which the sandwiched cutting element is slidably and/or movably received, wherein said gap may be slightly thicker than the sandwiched cutting element to provide for some play at least during non-use to reduce friction and heat generation. When the outer cutting element is pressed against the skin or at least contacts the skin during operation of the shaver/trimmer, it may deflect and at least then closely fits onto the inner cutting element. Although the sandwiched cutting element may move relative to the other cutting element without friction or at very low friction, it is nevertheless prevented from deflection even when the thickness of the sandwiched cutting element is very small.

Positioning the rigid support edges next to or in close proximity to or immediately adjacent to the cutting perforations along the outer edge of said field of cutting perforations, helps in making the cutting perforations smoothly cut even very short hairs without tugging and pulling.

To achieve low friction and avoid clamping of hairs between the cutting teeth at the same time, said gap from the tip portions of the supporting ribs to the outer cutting element may have a thickness which is larger than the thickness of the sandwiched cutting element only by an amount smaller than the thickness of hair to be cut.

More particularly, the amount by which the width of said gap exceeds the thickness of the sandwiched cutting element may be less than 40 μm. For example, it may range from 20 μm to 40 μm. Such configuration is a good compromise between still easy manufacturing and sufficiently small risk of pulling and tugging hair to be cut.

Said skin contact surface defined by the outer cutting element may be substantially plane or flat. In the alternative, said skin contact surface defined by the outer cutting element may be slightly convex or slightly dome-shaped when viewed in a cross section taken perpendicular to the reciprocating direction. When viewed in a cross-sectional plane parallel to said axis of reciprocation, the skin contact surface may be linear. Thus, the skin contact surface may be slightly, smoothly convex in terms of a shallow chute-like or trough-like shape.

Both the outer cutting element and the inner cutting element may have such shape corresponding to the skin contact surface.

So as to keep the inner and outer cutting elements snugly fitting onto each other in the region where the cutting perforations are formed, it may be helpful when the rigid or flexible support ribs, with their support edge, extend directly adjacent to or closely neighboring an outer boundary of the field of perforations. The support ribs, with their support edges, may contact the inner cutting element immediately along the outermost rows of perforations.

In the alternative, said support edge of the support ribs may contact the inner cutting element along a line spaced apart from the outermost rows of perforations. Nevertheless, the support edges of the support ribs may be positioned closer to the outermost rows of perforations then to the cutting teeth at the opposite edges of the cutting elements.

More particularly, the distance of the support edges of the support ribs from the field of perforations may be less than ⅓ or less than ¼ of the distance of the support edges from the comb-like cutting teeth.

So as to take up the skin contact pressure induced in the inner cutting element via the outer cutting element in a balanced way, the support edges of the support ribs facing the inner cutting element may be spaced from each other at a distance ranging from 35% to 70% or 40% to 60% of the distance defined between the rows of comb-like teeth at the opposite edges of the cutting elements. Depending on the user's preference, different portions of the skin contact surface defined by the outer cutting element may be pressed against the skin with varying forces so that varying skin pressure may arise. So as to balance such varying pressures, it is helpful when the inner cutting element is supported by said support ribs at about ⅓ and about ⅔ of the span width of the inner cutting element when considering a cross sectional view thereof.

Said support ribs and/or their supporting edges contacting the inner cutting element may extend parallel to the axis of reciprocation and/or parallel to the rows of comb-like teeth at the opposite edges of the cutting elements.

The support ribs may be anchored at the base portion of the support structure in different ways.

For example, the support ribs may be welded to said base portion or embedded in the material of said base portion. For example, when there are separate support ribs, each of the ribs may be inserted into a slot-like recess in said base portion to hold the support ribs in the desired orientation and position.

In the alternative, the support ribs inclined to each other at an acute angle, may be connected to each other in one piece and/or form integral parts of a support rib element. More particularly, the support ribs may be formed by V-like limbs of a support frame insert that can be inserted into the support structure supporting the cutting elements and/or attached to the base portion of such support structure. Such support rib insert may have a chute-like or trough-like configuration including a strip-like bottom portion from which the two support ribs extend at the described inclination. Such chute-like insert can be inserted into the support structure and fixedly attached to the base portion thereof. For example, the bottom portion of the insert may be seated onto the inner surface of a bottom portion of the outer support frame at a center portion thereof, wherein the central bottom portion of the outer support frame may form a seat for the support rib insert. Seating the support rib insert onto the bottom portion of the outer support frame may take up the support forces and pressure induced into the support ribs, thereby pressing the support rib insert onto the bottom portion of the outer support frame.

Said inner support frame insert may be fixedly attached to the outer support frame, e.g. glued and/or welded and/or form-fitted thereto.

Said outer support frame portions holding the outer cutting element at opposite edge portions thereof, together with the outer cutting element may define a cutter head chamber which may be configured tube-like to bevel-like with open or closed end faces. So as to allow hair dust or cut hair stubbles to be discharged from such cutter head chamber, the axial end sides of said cutter head chamber may be open.

More particularly, such cutter head chamber defined by the outer frame portions and the outer cutting element may be divided into a plurality of sub-chambers by the aforementioned support ribs of the inner support frame. More particularly, the cutter head chamber may be divided by the rigid support ribs into an inner sub-chamber for collecting short hair particles from the cutting perforations and a pair of outer sub-chambers for collecting long hair particles cut by the comb-like cutting teeth.

Each of said inner and outer sub-chambers may extend from the base portion of the support structure to the inner cutting element, wherein said paid of outer sub-chambers together may define a volume ranging from 50% to 120% or 66% to 100% of the volume of said inner sub-chamber. In other words, the inner subchamber may have a volume larger than the outer subchambers.

The hair dust collected in the inner sub-chamber and coming from the perforations as well as the cut hair stubbles collected in the outer sub-chambers may be discharged from the respective subchambers via at least one open end face, wherein each of opposite ends of said subchambers may be open to enhance cleaning of said subchambers and discharging collecting hair dust therefrom.

The sandwiched cutting element may be driven by a driver which is connected to the inner cutting element and coupled to a drive train transmitting a driving action of a drive unit, wherein the aforementioned inner support frame including the rigid support ribs and the outer support frame including the outer frame portions holding the outer cutting element and the base portion backing the inner support frame, may include one or more central, elongated or slit-like through-holes in which a portion of said driver and/or said drive train is slidably received. In other words, the driver and/or drive train extends through said through-hole in the inner and outer support frames and is slidably received therein to allow for reciprocating of the driver and thus, the sandwiched cutting element relative to the other cutting element.

The driver may include an elongated rod-like portion attached to opposite end portions of the inner cutting element and accommodated in the inner sub-chamber defined between the rigid support ribs and the inner cutting element.

The sandwiched cutting element may be the driven cutting element which may reciprocate or rotate, depending of the type of drive.

Basically, each of the cooperating cutting elements may be driven. However, to combine an easy drive system with safe and soft cutting action, the upper or outer cutting element having the skin contact surface may be standing and/or may be not reciprocating and not rotating, whereas the lower or inner cutting element which may be the sandwiched cutting element, may reciprocate or rotatorily oscillate.

As can be seen from FIG. 1, the cutter system 3 may be part of a cutter head 2 which may be attached to a handle 100 of a shaver and/or trimmer 1. More particularly, the shaver and/or trimmer 1 may include an elongated handle 100 accommodating the electronic and/or electric components such as a control unit, an electric drive motor or a magnetic drive motor and a drive train for transmitting the driving action of the motor to the cutter system at the cutter head 2 which cutter head 2 may be positioned at one end of the elongated handle 100, cf. FIG. 1.

The cutter system 3 including a pair of cooperating cutting elements 4 and 5 may be the only cutter system of the cutter head 2 as it is the case with the example shown in FIG. 1. On the other hand, the cutter system 3 may be incorporated into a cutter head 2 having other cutter systems such as shear foil cutters, wherein, for example, the cutter system 3 having at least one row of cooperating cutting teeth 6, 7 may be positioned between a pair of shear foil cutters, or, in the alternative, may be positioned in front of such a shear foil cutter.

As shown by FIG. 1, the cutter system 3 may include elongated rows of cutting teeth 6 and 7 which may reciprocate relative to each other along a linear path so as to effect the cutting action by closing the gaps between the teeth and passing over each other. On the other hand, the cutter system 3 also may include cutting teeth 6 and 7 which are aligned along a circle and/or are arranged radially. Such rotatory cutting elements 4 and 5 may have cutting teeth 6 and 7 projecting substantially radially, wherein the cutting elements 4 and 5 may be driven to rotate relative to each other and/or to rotatorily oscillate relative to each other. The cutting action is basically similar to reciprocating cutting elements as the radially extending teeth, when rotating and/or rotatorily oscillating, cyclically close and reopen the gap between neighboring teeth and pass over each other like a scissor.

Figure 2:
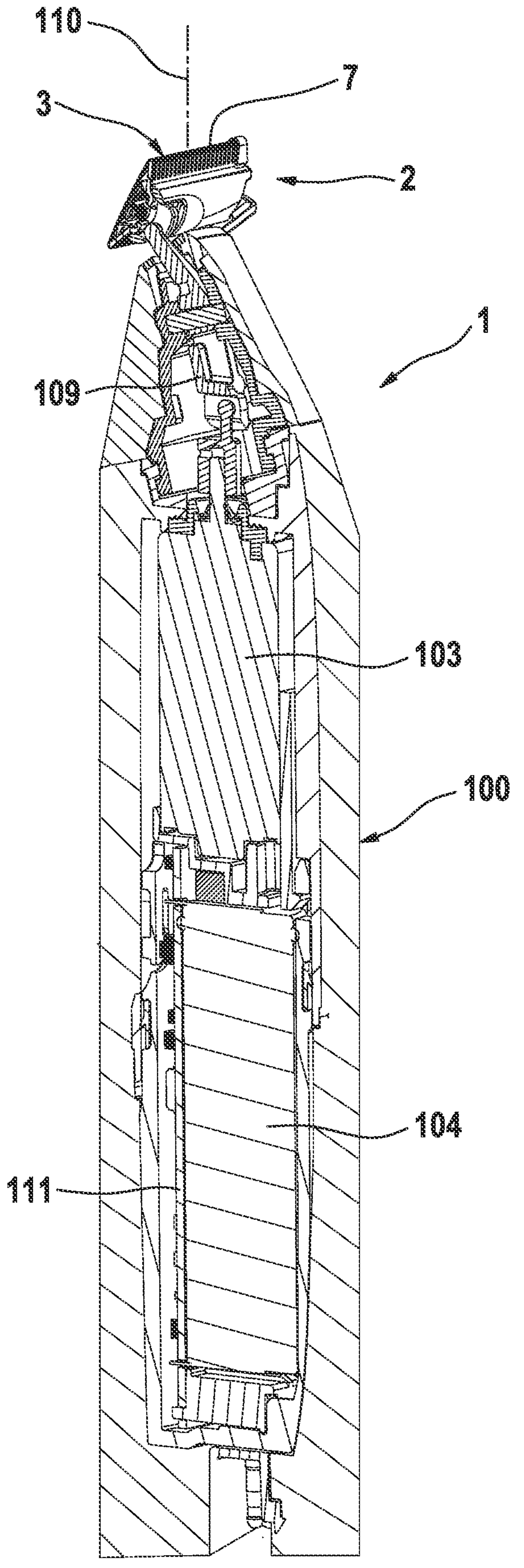
FIG. 2: a cross sectional view of the beard trimmer/shaver showing the cooperating comb-like cutting elements and the drive system for driving said cutting elements.

As shown by FIG. 2, the drive system may include a motor 103 the shaft of which may rotate an eccentric drive pin which is received between the channel-like contours of a driver 18 which is connected to one of the cutting elements via the drive train 109 which is caused to reciprocate due to the engagement of the rotating eccentric drive pin with the contours of said driver 18. The motor 103 is energized by a battery 104 provided below the motor in the handle housing. Next to the battery 104 there is a control unit 111 for controlling the motor 103—all of which provided inside the handle housing—in accordance with an on/off button or other control options.

Figure 3:
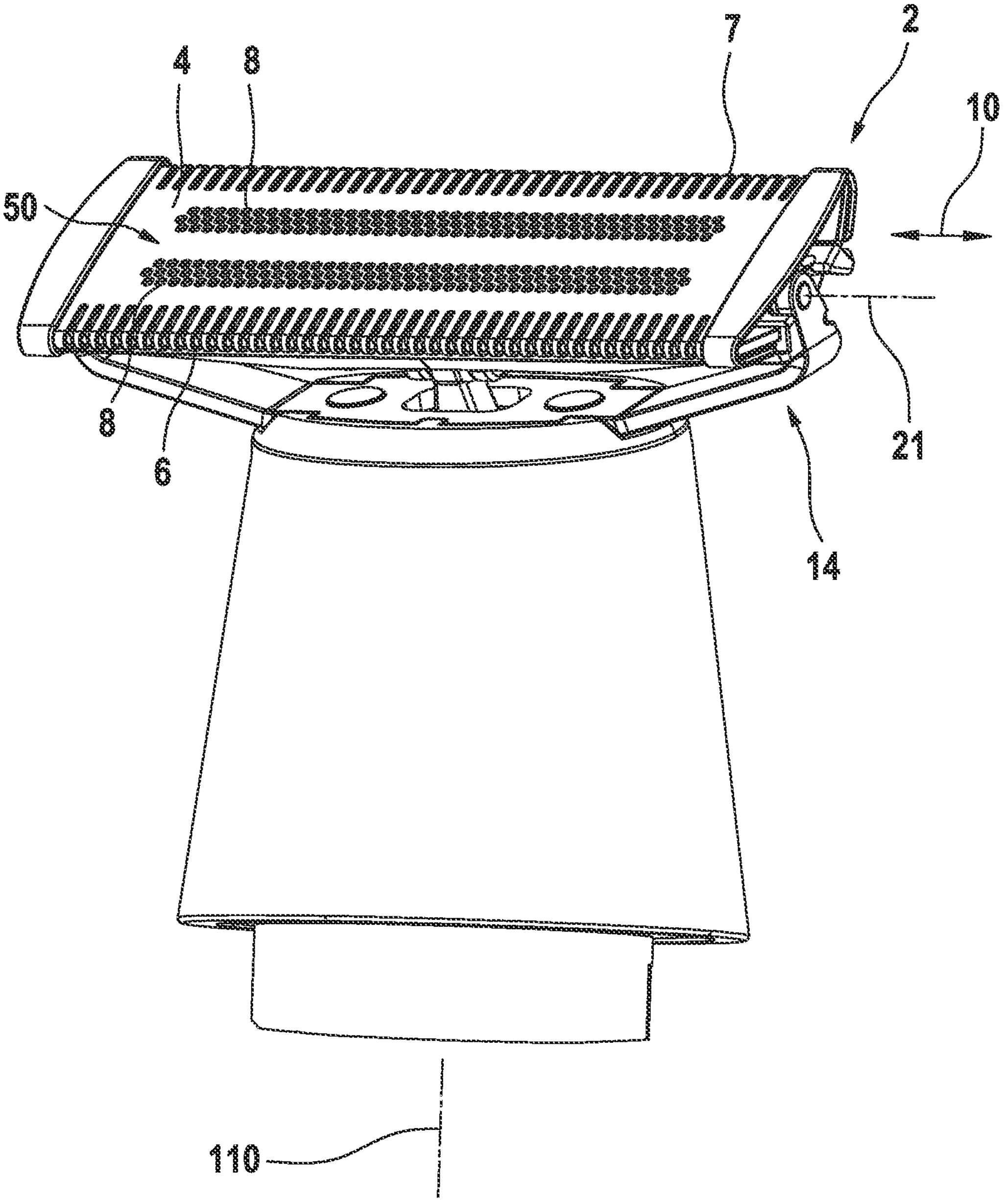
FIG. 3: a perspective view of the cutter system including the pair of cooperating comb-like cutting elements and the support structure for supporting the cutting elements relative to each other, FIG. **4*a*-4*b*: a cross sectional view of the cutter system and the support structure, wherein the C-shaped outer cutting element is shown to be bent or curved around outer frame portions and an inner cutting element is shown to be supported by a V-shaped inner support frame having support ribs extending from a base portion of the support structure at a steeper angle then said outer frame portions, wherein partial view (a) shows rigid support ribs whereas view (b) shows flexible, spring-like support ribs.
Figure 4A:
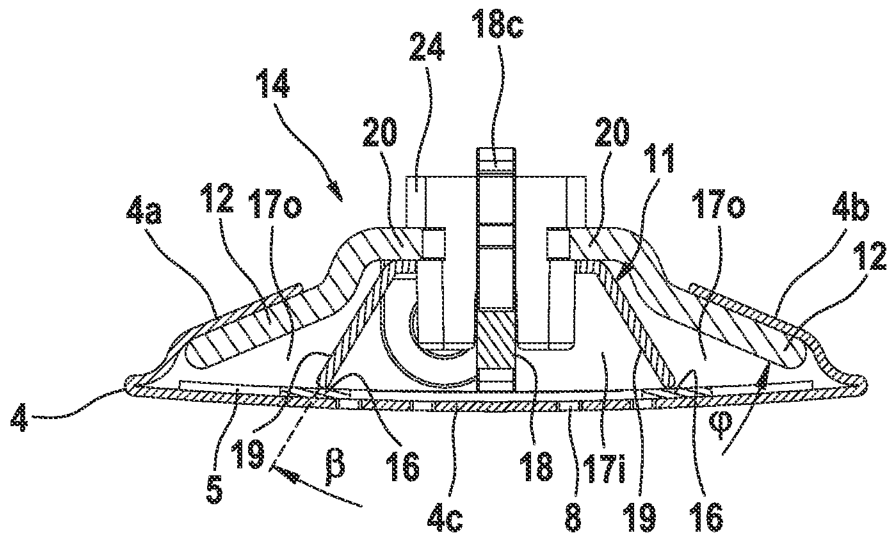
Figure 4B:
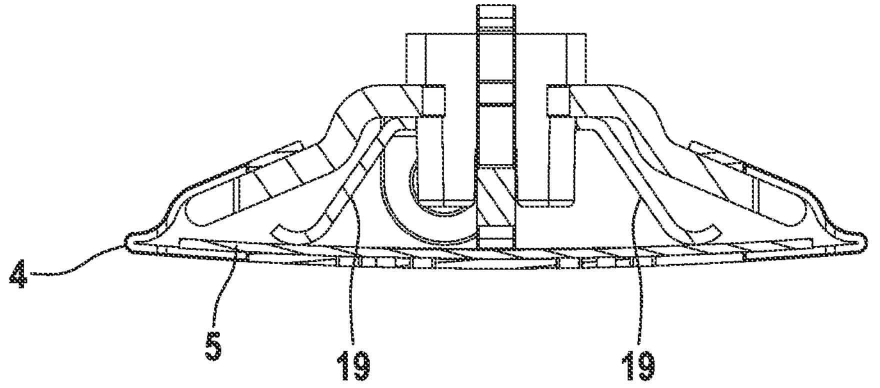
Figure 5A:
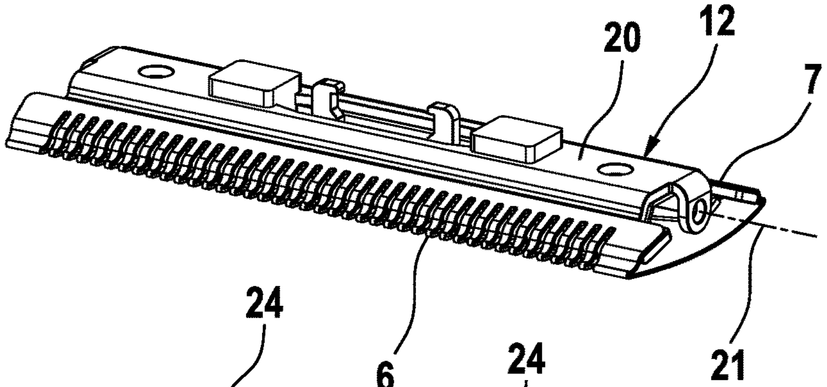
FIG. 5*a*-5*b*: an exploded perspective view of the elements of the cutter system including the outer and inner cutting elements, an outer support frame for holding the outer cutting element, a chute-shaped or trough-shaped inner support frame including rigid support ribs for supporting the inner cutting element, a driving element for reciprocating the inner cutting element and guide blocks for guiding the reciprocating driving element.
Figure 5B:
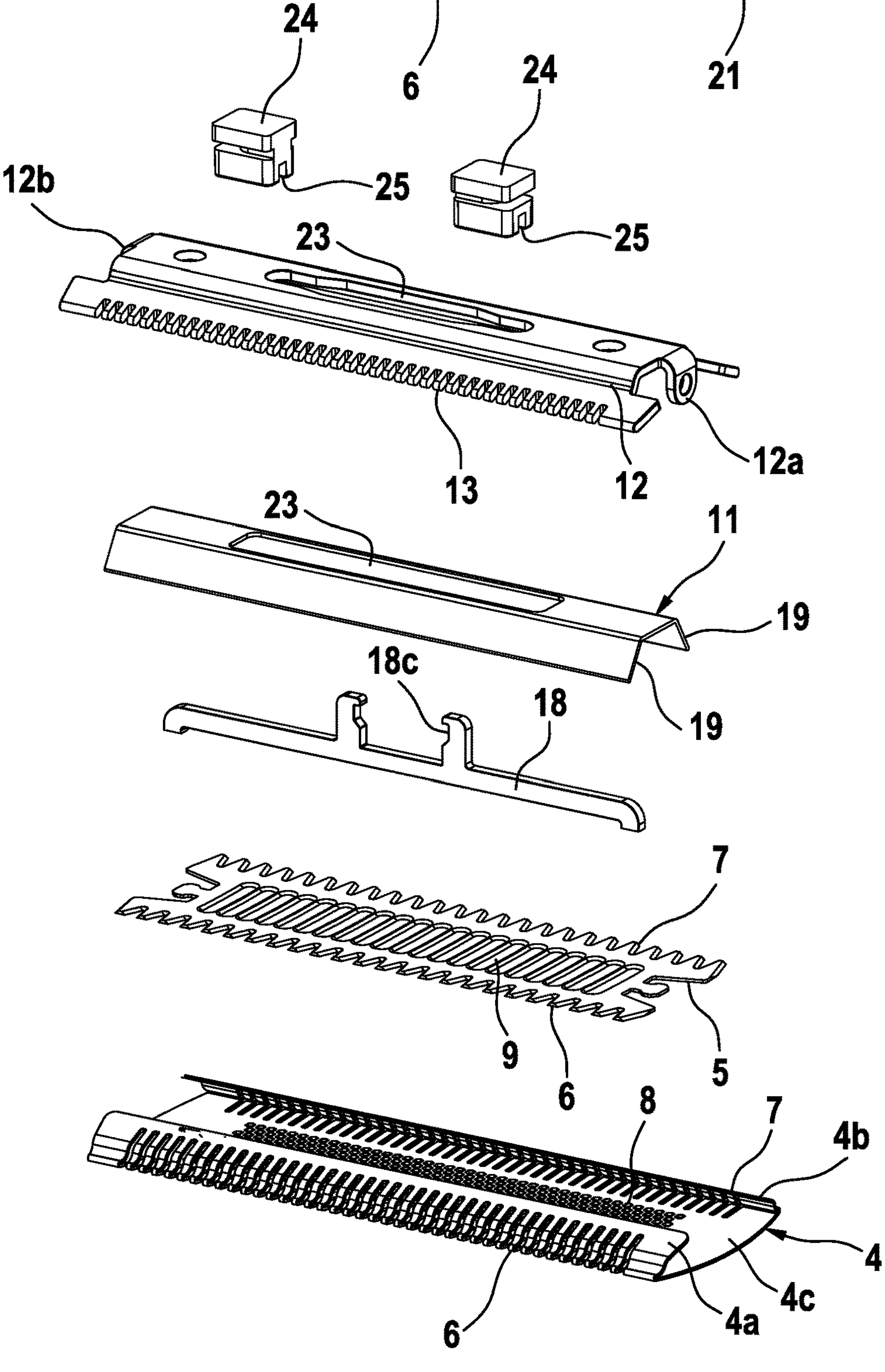

As shown by FIGS. 3, 4*a* and 4*b*, and 5, the cooperating cutting elements 4 and 5 basically may have—at least roughly—a plate-shaped configuration, wherein each cutting element 4 and 5 includes two rows of cutting teeth 6 and 7 which may be arranged at opposite longitudinal sides of the plate-like cutting elements 4 and 5, cf. FIGS. 4*a* and 4*b*, and FIG. 5. The cutting elements 4 and 5 are supported and positioned with their flat sides lying onto one another. More particularly, the cutting teeth 6 and 7 of the cutting elements 4 and 5 touch each other back to back like the blades of a scissor.

In addition to such comb-like cutting teeth 6 and 7, the cooperating cutting elements 4 and 5 may be provided with at least two fields of cutting perforations arranged between the rows of cutting teeth 6 and 7 in a middle portion of the cutting elements 4 and 5. More particularly, each field of cutting perforations 8 of the outer cutting element 4 defining a skin contact surface of the cutter system 3 may include at least two rows of perforations 8 which may be formed as small sized through-holes having a circular, oval, elliptical or polygonal shape.

In particular, such small sized through-holes forming the perforations 8 may have a hexagonal shape, wherein the long axis of such hexagonal through-holes, i.e. the axis going through opposite corners of the hexagonal shape, may be oriented transverse to the axis of reciprocation of the cutting elements 4 and 5.

Figure 9:
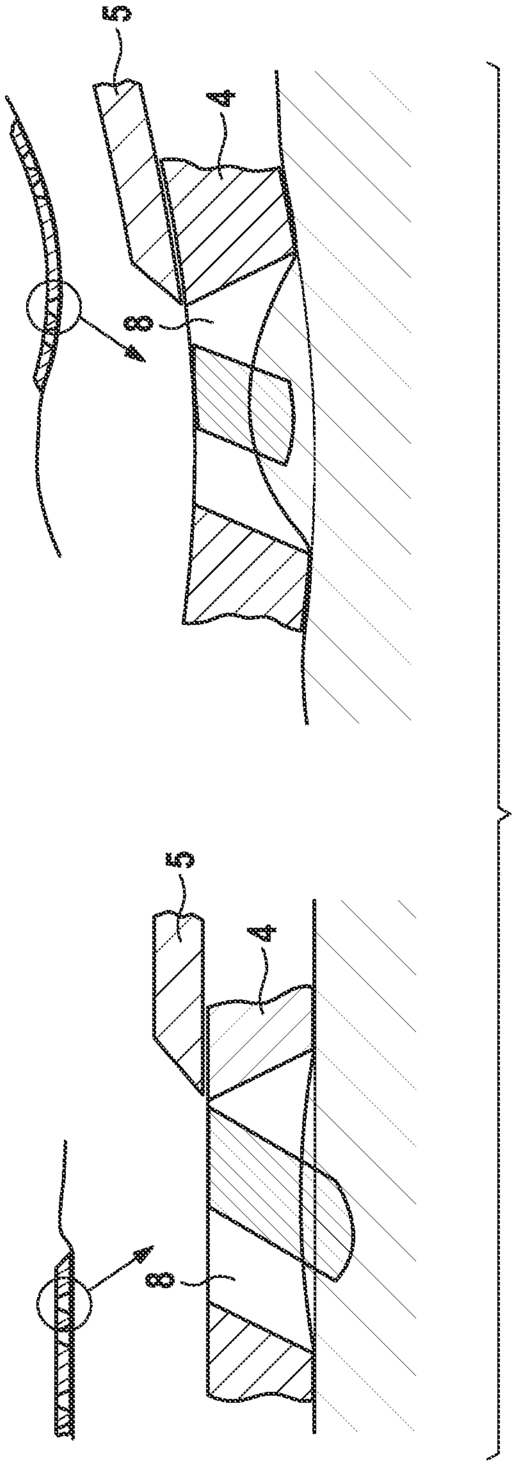
FIG. 9: a cross-sectional view of perforations having a conical or non-cylindrical contour expanding towards the skin contact surface for helping hair entering the perforation with left side views (small and enlarged) for planar cutting elements and right side views (small and enlarged) for doom/convex curved shaped cutting elements.

As can be seen from FIG. 9, the perforations 8 may expand towards the skin contact/facing surface, i.e. the cross-sectional area of the perforations 8 becomes larger towards the skin contact surface. Such trumpet-like or conical or truncated pyramid-like shape helps hair to enter the perforations, as can be seen from FIG. 9.

Figure 8:
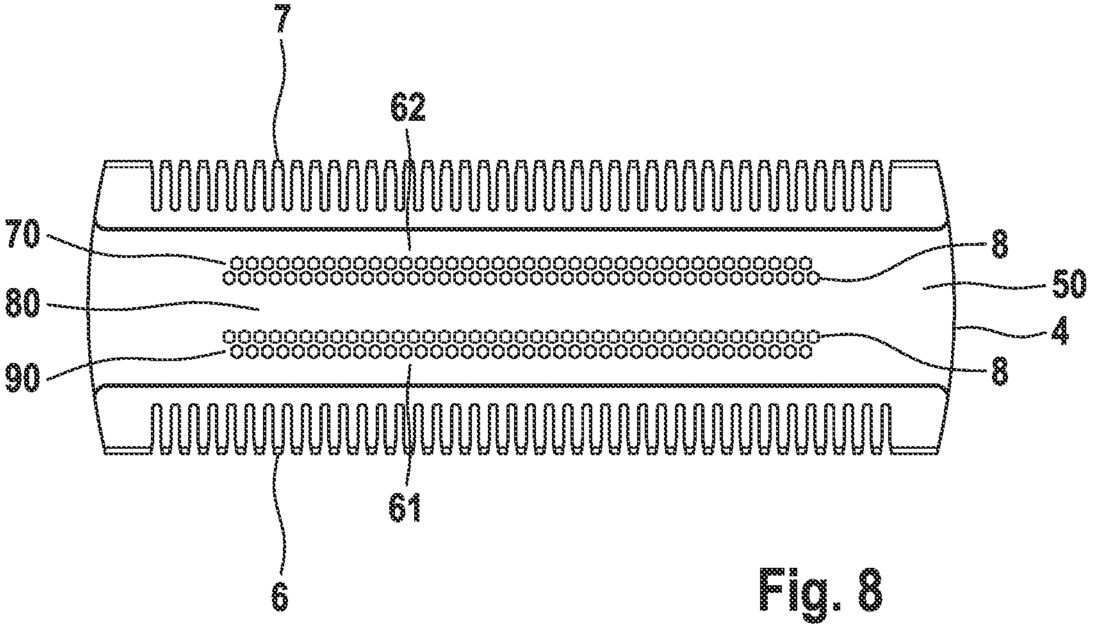
FIG. 8: a plain view of the outer cutting element showing the separate fields of perforations thereof.

As can be seen from FIG. 8, the perforations 8 are not distributed all over the center section of the skin contact surface, but are arranged in limited areas only. More particularly, the cutting perforations 8 for cutting short hair are restricted to fields 70, 90 of the skin contact surface or skin facing surface 50 of the outer cutting element 4 following the comb-like cutting teeth 6, 7 when the cutter system 3 is moved along the skin to be shaved with one of the rows of comb-like teeth 6, 7 moving ahead, whereas a center section 80 of the skin contact/facing surface defined by the cutting elements in-between said opposite rows of comb-like teeth is unperforated.

Such arrangement of fields 70, 90 of perforations 8 spaced apart from each other takes into account that very short hair is cut by the perforations 8 immediately following the leading one of the rake-like cutting edges, whereas the perforations further away from the leading comb-like cutting edge are less effective in cutting very short hairs. Due to the elimination of perforations in areas of the skin contact surface 50 less effective in cutting very short hairs reduces the friction between the cutting elements 4, 5 without sacrificing efficiency in cutting very short hairs. Friction is reduced as less cutting edges of less perforations need to pass each other when the cutting elements move relative to each other and, thus, hair particles already cut or hair dust coming from the cutting perforations moving ahead over the skin to be shaved is not cut or grinded once again so frictional losses are reduced.

More particularly, the cutting perforations 8 may be arranged in two separated elongated fields 70, 90 of perforations 8 which are separated from each other by an elongated unperforated center section 80 of an outer one of said cutting elements 4 defining a skin contact surface 50, and which include each at least two rows of perforations 8 extending along and/or parallel to the rows of comb-like cutting teeth 6, 7.

So as to allow for sufficient support of the cutting elements moving relative to each other without interfering with the cutting action of the comb-like teeth 6, 7 and perforations 8, said fields 70, 90 of perforations 8 also may be separated from or spaced apart from the rows of comb-like teeth 6, 7 by elongated, unperforated side sections 61, 62 of said outer cutting element, wherein the support structure may include a pair of flexible or rigid support ribs 19 supporting an inner one of said cutting elements 5 under said unperforated side sections 61, 62 adjacent to or along outer boundaries of said fields 70, 90 of perforations 8.

So as to reduce friction due to engagement of the support structure 14 with the moving cutting element 5, the inner cutting element 5 may extend unsupported under said unperforated center section 80 between said fields 70, 90 of perforations 8.

Said elongated unperforated center section 80 of the skin contact surface 50 defined by the outer cutting element may have a size or width which is larger than a size or width of each of said fields 70, 90 of perforations 8. More particularly, the unperforated center section of the skin contact surface may extend over an area ranging from 100%-250% or from 110% to 175% of the area defined by each of said fields of perforations, cf. FIG. 8.

More generally, more than ⅔ or more than ¾ of the area of the skin contact surface 50 of the outer cutter element 4 between the comb-like cutting teeth may be unperforated. In other words, only ¼-⅔ of the skin contact surface 50 between the opposite rake-like toothed edges of the cutter system 3 may be perforated, as it is shown by FIG. 8. Such limitation of the area of perforations 8 may significantly reduce the friction when the cutting elements 4, 5 move relative to each other.

Such perforations 8 in the outer cutter element 4 may cooperate with perforations 9 in the inner cutting element 5 when said cutting elements 4 and 5 reciprocate relative to each other along the axis of reciprocation 10. Said perforations 9 in the inner cutting element 5 also may be formed as small sized through-holes of a shape corresponding to or differing from the shape of the perforations 8 in the outer cutting element 4. However, as can be seen from FIG. 5, the perforations 9 in the inner cutting element 5 do not need to be small sized through-holes, but may be larger sized cutouts each cooperating with more than one perforations 8 in the other cutting element 4. More particularly, the perforations 9 in the inner cutting element 5 may be formed as longitudinal, slot-like cutouts extending, with their longitudinal axis, transverse to the axis of reciprocation 10. Thus, each elongated transverse perforation 9 in the inner cutting element 5 may cooperate with each row of perforations in the outer cutting element 4.

Said cutouts in the inner cutting element 5 overlap with the perforations 8 in the outer cutting element 4 and, depending on the reciprocating action, close said perforations 8 to effect a shearing action and/or cutting-off of hairs introduced into the perforations 8 and 9.

As can be seen from FIG. 3 and FIG. 8, said rows of perforations 8 may substantially extend parallel to the rows of comb-like cutting teeth 6 and 7 in a portion of the cutting elements 4 and 5 between said rows of comb-like cutting teeth 6 and 7.

So as to support the cutting elements 4 and 5 in the aforementioned position lying and/or seated onto each other back-to-back, but still allowing reciprocating movement of the cutting teeth 6 and 7 and the perforations 8 and 9 relative to each other, the inner cutting element 5 is sandwiched between the outer cutting element 4 and a support structure 14 which includes an inner frame supporting the inner cutting element 5 and an outer frame 12 holding the outer cutting element 4, cf. FIG. 4 *a*.

More particularly, said support structure 14 defines a gap 16 in which the inner cutting element 5 may move relative to the outer cutting element 4, wherein the inner cutting element 5 is slidably guided in said gap 16.

More particularly, as can be seen from FIGS. 4*a* and 5, the outer cutting element 4, when viewed in a cross section, may have a substantially C-shaped configuration with dog-eared edge portions 4*a* and 4*b* which are bent away or curved away from the skin contact surface and form holding flanges attached to or fixed to said outer frame portions 12 of the support structure 14. Said edge portions 4*a* and 4*b* may be folded back or bent around the edge portions of said outer frame 12, as it can be seen from FIG. 4*a*. However, in the alternative, it also would be possible to seat said holding flanges 4*a* and 4*b* of the outer cutting element 4 onto the inner side of said outer frame 12.

The outer cutting element 4 may be rigidly or fixedly fastened to said outer frame 12. For example, the outer cutting element 4 may be welded or glued to the outer frame 12.

As can be seen from FIGS. 4*a* and 5, said outer frame 12 of the support structure 14 may include a pair of diverging legs forming a shallow chute or trough, wherein the edge portions of said support legs of the outer frame 12 may be provided with slot-like cutouts 13 forming a toothed edge basically corresponding to the cutting teeth 6 and 7 of the cutting elements 4 and 5. More particularly, said cutouts 13 in the edges of the outer frame 12 allow hair to be cut to enter into the teeth 6 and 7 of the cutting elements 4 and 5, but at the same time provide for support to the cutting teeth 6 of the outer cutting element 4 to some extent.

The cutting teeth 6 of the outer cutting element 4 may be formed in the transitional region between the folded back support flanges 4*a* and 4*b* and the front side of the outer cutting element 4 defining the skin contact surface of the cutter system 3.

Said outer cutting element 4 may form a C-shaped, plate-like cutting element the edges of which are dog-eared to form limbs bent inwardly like the limbs of a C or a U, wherein such dog-eared flanges 4*a* and 4*b* are held by said outer support frame 12. The transitional edge portion connecting the dog-eared limbs with the central portion of the outer cutting element is contoured or configured to form a row of comb-like teeth 6 for cutting longer stubbles, whereas the central portion 4*c* of the outer cutting element 4 is provided with said fields of perforations 8 for cutting short hair.

As can be seen from FIG. 4*a*, the outer cutting element 4, together with the outer frame 12 of the support structure 14, defines a chamber 17 which is surrounded by the outer cutting element 4 and the outer frame 12.

Within such chamber 17, the inner frame 11 for supporting the inner cutting element 5 is arranged. Said inner frame 11 includes at least one pair of support ribs 19 which extend from a base section or portion 20 of the support structure 14 towards the inner cutting element 5 lying, back to back, onto the outer cutting element 4.

More particularly, as can be seen from FIG. 4*a*, said support ribs 19 originate from a center section of the outer frame 12 where the diverging support legs of the outer frame 12 join each other. Said support ribs 19 of the inner frame 11 may extend from said base section 20 towards the inner cutting element 5 at an angle β which is considerably steeper than the angle φ between the outer frame 12. As can be seen from FIG. 4*a*, the support ribs 19 of the inner frame 11 may define an angle β from 2×20° to 2×40° or 2×25° to 2×30° between each other, wherein said support ribs 19 may be arranged symmetrical with regard to a center plane going perpendicular to the skin contact surface and parallel to the axis of reciprocation 10.

So as to give the support ribs 19 sufficient rigidity, said support ribs 19 may have a straight longitudinal axis when viewed in a cross-sectional view as it is shown in FIG. 4*a*. In other words, the inner and outer surfaces of the support ribs 19 may be plane and flat so as to achieve buckling stiffness. These support ribs 19 may define a V-shaped configuration originating from the base section 20.

In the alternative, said support ribs 19 may be configured flexible and/or elastically so as to bias inner the cutting element 5 onto the outer cutting element 4, as shown by FIG. 4*b*. For example, the support ribs 19 may have a flexing, curved contour when viewed in cross-section, cf. FIG. 4*b*, so as to elastically urge the inner cutting element 5 against the outer cutting element 4.

As can be seen from FIG. 5, the support ribs 19 may be part of a supporting insert and/or formed in one piece with each other. More particularly, the inner frame 11 may have a chute-like or trough-like configuration including a strip-like bottom portion from the edges of which said pair of support ribs 19 extends. For example, said inner frame 11 including the support ribs 19 may be formed from a substantially rectangular metal plate, wherein strip-like edge portions may be bent relative to a middle-section so as to form the inclined support ribs 19.

Said inner frame 11 may form an insert that can be inserted into the chamber 17 defined by the outer frame 12 and the outer cutting element 4. More particularly, said insert forming the inner frame 11 may be seated onto the base section 20 of the outer frame 12 which base section 20 takes up the forces and pressure induced into the inner frame 11 when the cutter system 3 is pressed against skin to be shaved.

The inner frame 11 is configured such that the aforementioned gap 16 is defined between the support edges of the support ribs 19 on the one hand and the inner side of the outer cutting element 4 on the other hand. More particularly, the height of the support ribs 19 is configured such that said gap 16 between the support edges of the support ribs 19 and the outer cutting element 4 substantially corresponds to the thickness of the inner cutting element 5, wherein the gap 16 may be configured to be slightly wider than the thickness of the plate-like cutting element 5 so as to reduce friction and to provide some play between the inner cutting element 5 and the support ribs 19 and the inner cutting element 5 and the outer cutting element 4. Such play may be given when the cutter system 3 is unloaded, i.e. not pressed against a skin to be shaved. In the operational state, when the outer cutting element 4 is pressed against the skin to be shaved, such play is eliminated and the cutting elements 4 and 5 are snuggly fitted onto each other to achieve smooth cutting of hair.

Despite such possible play provided by the support structure 14, the support ribs 19 are configured such that the gap 16, in its width, exceeds the thickness of the outer cutting element 4 by an amount which is smaller than the thickness of hair to be cut. For example, the width of the gap 16 may be larger than the thickness of the sandwiched cutting element 5 by an amount smaller than 40 μm or ranging from 20 μm to 40 μm.

In the alternative, when the support ribs 19 are flexible as shown by FIG. 4*b*, the defined gap 16 may be zero or at least smaller than the thickness of the cutting blade 5 so as to achieve biasing.

As can be seen from FIG. 4*a*, the inner and outer cutting elements 4 and 5 may have a slightly convex contour. More particularly, the skin contact surface defined by the outer cutting element 4 may have a slightly convex, substantially chute-like configuration. When viewed in a cross section taken perpendicular to the axis of reciprocation 10, the outer surface of the outer cutting element 4 may be slightly dome-shaped, cf. FIG. 4*a*.

The inner cutting element 5 substantially corresponds to the shape of the outer cutting element 4 in terms of said slightly convex chute-like shape.

As can be seen from FIGS. 4*a* and 4*b*, the support edges of the support ribs 19 facing the inner cutting element 5 may be spaced from each other at a distance ranging from about 35% to 70% or 40% to 60% of the distance defined between the rows of comb-like teeth 6 and 7 at the opposite edges of the outer cutting element 4. Thus, the rigid support ribs 19 may support the outer cutting element 4 at about ⅓ and about ⅔ of its span width, when viewed in a cross-section perpendicular to the axis of reciprocation 10. More particularly, the support edges of the support ribs 19 may extend directly adjacent to the outer boundaries of the field of perforations 8, wherein said support ribs 19 may contact the inner cutting element 5 along the outer longitudinal contour of the cutouts forming the perforations 9 in the inner cutter element 5.

Due to the configuration of the support ribs 19 extending from the base section 20 of the support structure 14 at an angle steeper than the support legs of the outer frame 12, the chamber 17 defined by the outer frame 12 and the outer cutting element 4 attached thereto, is divided by said support ribs 19 into an inner subchamber 17*i* and a pair of outer subchambers 170, cf. FIG. 4*a*, wherein the outer subchambers 170 together may have a volume substantially corresponding to the volume of the inner subchamber 17*i*.

The rigid support ribs 19 of the inner frame 11 may extend substantially parallel to the axis of reciprocation 10. More particularly, the support edges of the support ribs 19 contacting the inner cutting element 5 may extend parallel to the axis of reciprocation 10.

Figure 6:
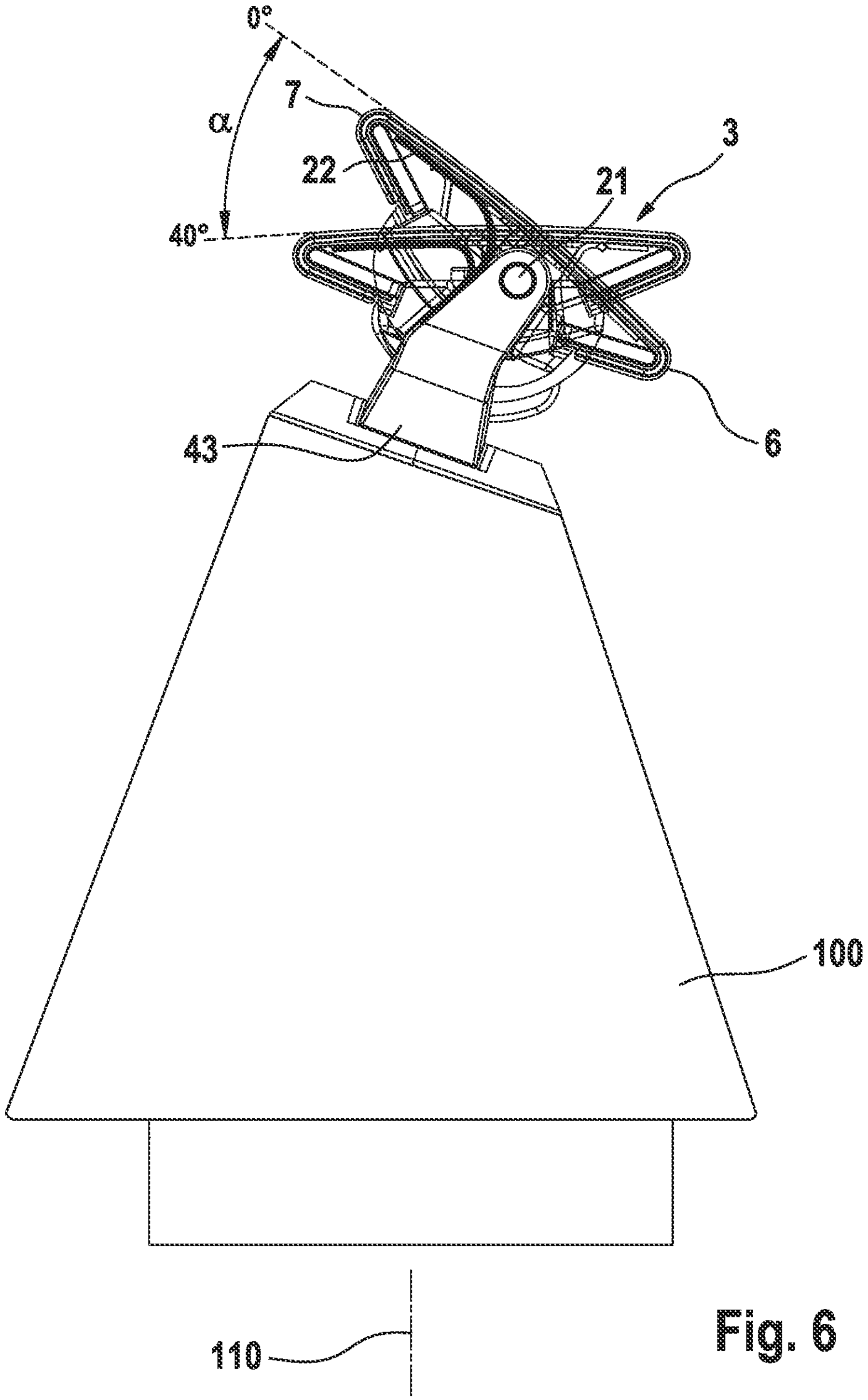
FIG. 6**: a side view showing the pivoting of the cutter system relative to the handle of the shaver/trimmer as allowed by the support structure.
Figure 7:
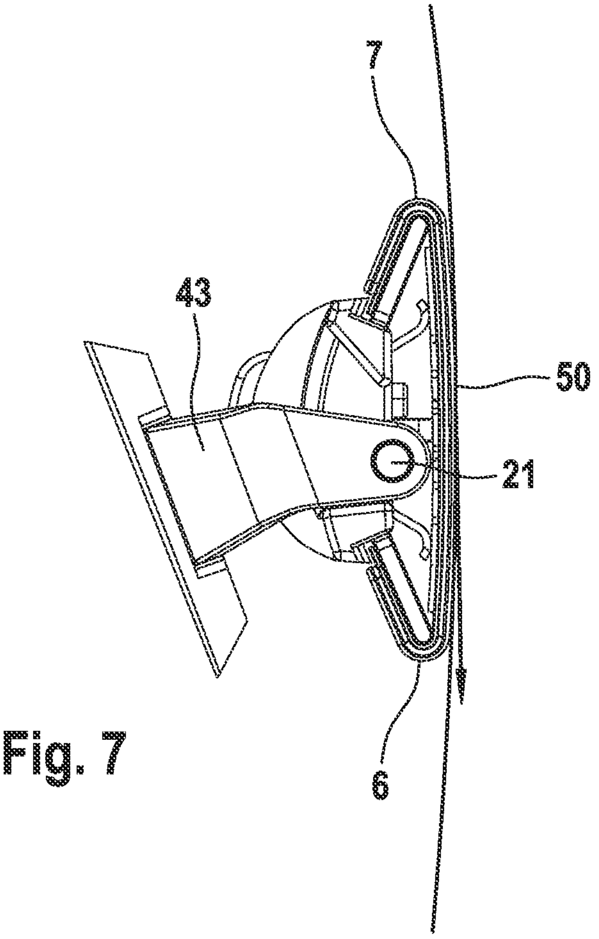
FIG. 7: a side view showing the cutter system pivoting about its pivot axis when following the skin contour.

As can be seen from FIGS. 6 and 7, the cutter head 2 including the cutter system 3 may be pivotably supported relative to the handle of the shaver and/or trimmer 1 about a pivot axis 21 which may extend substantially parallel to the axis of reciprocation 10. Said pivot axis 21 may be positioned close to the cutting elements 4 and 5 and/or within the chamber 17 surrounded by the outer cutting element 4 and the outer frame 12.

As can be seen from FIGS. 5 and 6, the outer frame 12 of the support structure 14 holding the outer cutting element 4 may include a pair of pivot bearing sections 12*a* and 12*b* which may be spaced from each other and/or positioned at the opposite end faces of the outer frame 12. On the other hand, a pair of support flanges 110 may be provided at the cutter head side of the handle 100, wherein said pivot bearing flanges 110 may be rotatably connected to said pivot bearing sections 12*a* and 12*b* of the outer frame 12 to form the pivot axis 21.

A spring device 22 may be associated with said pivot axis 21 so as to urge the cutter head 2 in a desired, mutual pivot position or orientation which may be a middle orientation allowing pivoting into opposite directions or, in the alternative, an end position or end orientation allowing pivoting into one direction only.

Said spring device 22 may be engaged with the support flanges 110 of the handle 100 on the one hand and the outer frame 12 on the other hand.

So as to drive the cutting elements 4 and 5 in a reciprocating manner relative to each other, a driver 18 may be connected to the inner cutting element 5, wherein such driver 18 may include a rod-like driving element attached to opposite end portions of the inner cutting element 5. On the other hand, said driver 18 may include a coupling section 18*c* to be coupled with a driving element extending from handle 100 to the cutter head 2. More particularly, the inner frame 11 and the outer frame 12 of the support structure 14 may include an elongated recess 23 or cutout extending through the base section 20 of the support structure 14, wherein the aforementioned coupling section 18 *c* of driver 18 may extend through said elongated recess 23, cf. FIG. 5 and FIG. 4*a*, to allow coupling with the driving element of the drive train coming from the motor in the handle 100.

Said driver 18 may be slidably guided at the inner frame 11 and/or outer frame 12. For example, one or more guiding blocks 24 or bearings 24 may be provided at the outer frame 12. For example, such guiding blocks 24 may be inserted into the central, elongated recess 23 extending in the base portion of the outer frame 12, wherein said guiding blocks 24 may include slot-like grooves 25, in which the rod-like driver 18 may be slidably guided.

Said driver 18 may be accommodated between said rigid support ribs 19 of the inner frame 11. In particular, said driver 18 may be accommodated within the inner subchamber 17*i* and thus, may be surrounded by the chute-like insert forming the inner frame 11 including the rigid support ribs 19, wherein the coupling section 18*c* of the driver 18 may extend through the central, elongated recess 23 in the bottom portion of said insert forming the inner frame 11.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A cutter system for an electric shaver and trimmer, said system comprising:

a pair of cooperating cutting elements comprising an inner cutting element and an outer cutting element, wherein said inner cutting element and said outer cutting element each comprise two rows of comb cutting teeth at opposite edges thereof, wherein said inner cutting element and said outer cutting element each comprise at least one field of cutting perforations between said rows of comb cutting teeth, wherein said inner cutting element is movably supported relative to said outer cutting element by a support structure, said outer cutting element defining a skin contact surface, wherein said at least one field of cutting perforations of said outer cutting element includes at least two rows of perforations extending along said rows of comb cutting teeth, wherein said at least one field of cutting perforations of said inner cutting element comprises elongated transverse perforations, such that at least one elongated transverse perforation cooperates with a corresponding perforation in each of the at least two rows of perforations of the field of perforations of said outer cutting element, wherein a driver is slidably guided by the support structure and connected to the inner cutting element to drive the inner cutting, wherein said support structure is configured to sandwich said inner cutting element between said outer cutting element and support ribs of said support structure, wherein a gap is defined between said outer cutting element and said support ribs which is slightly wider than the thickness of the inner cutting element to reduce friction, said support structure further includes a pair of outer frame portions holding said outer cutting element at opposite edge portions thereof, and distal ends of the outer frame portions are spaced from the inner cutting element and the skin contact surface of the outer cutting element in a direction parallel to a direction of a thickness of the inner cutting element.

2. The cutter system according to claim 1, wherein said at least one field of cutting perforations of said outer cutting element is separated from said rows of comb teeth by elongated, unperforated side sections of said outer cutting element.

3. The cutter system according to claim 2, wherein said support ribs are defined by a pair of support ribs supporting said inner cutting element under said unperforated side sections along outer boundaries of said at least one field of perforations.

4. The cutter system according to claim 1, wherein said at least one field of cutting perforations of said outer cutting element is arranged in two separate elongated fields of perforations that are separated from each other by an elongated unperforated center section of said outer cutting element, said elongated unperforated center section has a width which is larger than a width of each of said two separate elongated fields of perforations.

5. The cutter system according to claim 4, wherein said skin contact surface which, in cross-sectional view, is continuously, smoothly dome-shaped from one of said rows of comb cutting teeth over said fields of perforations to the other one of said rows of comb cutting teeth, with said elongated unperforated center section defining a largest height over a straight base line going through tooth-tips of said rows of comb cutting teeth.

6. The cutter system according to claim 4, wherein each of said fields of perforations of said outer cutting element includes two to five rows of non-circular or hexagonal perforations, wherein a longer main axis of each of said non-circular or hexagonal perforations extends transverse to a longitudinal direction of said at least two rows of perforations.

7. The cutter system according to claim 4, wherein said inner cutting element extends unsupported under said elongated unperforated center section between said two separate elongated fields of said perforations.

8. The cutter system according to claim 4, wherein said elongated unperforated center section has a width that ranges from 100% to 250% of a width of each of said two separate elongated fields of perforations.

9. The cutter system according to claim 1, wherein more than ⅔ of an area of said skin contact surface of said outer cutting element defined between said comb cutting teeth is unperforated.

10. The cutter system according to claim 1, wherein said perforations of at least one of said inner element or said outer element have non-circular contours including a longer main axis and a shorter main axis, wherein said perforations are oriented such that said longer main axes extend transverse to said rows of comb cutting teeth and said shorter main axes extend parallel to said rows of comb cutting teeth.

11. The cutter system according to claim 10, wherein said non-circular contours are hexagonal.

12. The cutter system according to claim 1, wherein said support structure is configured to sandwich said inner cutting element between said outer cutting element and support edges of said support ribs of said support structure, wherein said inner cutting element is movably received in said gap, and wherein said support ribs extending from a base portion of said support structure.

13. The cutter system according to claim 12, wherein said support ribs extend from said base portion of said support structure at an angle (B) from 20° to 40°.

14. The cutter system according to claim 12, wherein said support edges of said support ribs facing said inner cutting element are spaced from each other at a distance ranging from 35% to 70% of a distance defined between said rows of comb cutting teeth at said opposite edges of said cutting elements.

15. The cutter system according to claim 12, wherein said support ribs are rigid so as to not flex under operational loads onto said cutting elements and, when viewed in cross-section, said support ribs define a V-shape and have a linear contour with flat side surfaces.

16. The cutter system according to claim 1, wherein said outer frame portions and said outer cutting element define a cutter head chamber which is divided by said support structure into an inner sub-chamber for collecting short hair particles from said perforations and a pair of outer sub-chambers for collecting long hair particles from said comb cutting teeth, wherein said inner sub-chamber communicates with each of said fields of perforations.

17. An electric shaver and trimmer, comprising said cutter system which is configured in accordance with claim 1.

18. The cutter system according to claim 1, wherein said perforations of said outer cutting element expand from a side opposite to said skin contact surface towards said skin contact surface of said outer cutting element.

19. The cutter system of claim 1, wherein said support structure includes said support ribs defined by a pair of support ribs, the driver is located between the pair of support ribs and directly connected to the inner cutting element.

* * * * *